(12) United States Patent
Simpson et al.

(10) Patent No.: US 11,248,560 B2
(45) Date of Patent: Feb. 15, 2022

(54) LINKAGE ASSEMBLY PREVENTING AXIAL ROTATION OF THE LINK ROD FOR A GAS TURBINE ENGINE

(71) Applicant: UNITED TECHNOLOGIES CORPORATION, Farmington, CT (US)

(72) Inventors: Alex J. Simpson, Tolland, CT (US); Robert T. Knowlton, Newington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 15 days.

(21) Appl. No.: 16/823,643

(22) Filed: Mar. 19, 2020

(65) Prior Publication Data

US 2020/0217271 A1 Jul. 9, 2020

Related U.S. Application Data

(63) Continuation of application No. 15/700,042, filed on Sep. 8, 2017, now Pat. No. 10,634,092.

(51) Int. Cl.
| | |
|---|---|
| *F02K 1/06* | (2006.01) |
| *F02K 1/12* | (2006.01) |
| *F02K 3/075* | (2006.01) |

(52) U.S. Cl.
CPC .............. *F02K 1/06* (2013.01); *F02K 1/1207* (2013.01); *F02K 3/075* (2013.01)

(58) Field of Classification Search
CPC ......... F02K 1/06; F02K 1/1207; B64D 33/04; F16C 11/0695; F16C 11/0614;
(Continued)

(56) References Cited

U.S. PATENT DOCUMENTS

| | | | |
|---|---|---|---|
| 4,210,405 | A | 7/1980 | Jesswein |
| 5,230,580 | A | 7/1993 | Henkel |

(Continued)

FOREIGN PATENT DOCUMENTS

| | | |
|---|---|---|
| EP | 1568903 A1 | 8/2005 |
| EP | 2921727 A1 | 9/2015 |

(Continued)

OTHER PUBLICATIONS

Extended European Search Report; No. 19214994.6; dated Apr. 28, 2020; 46 pages.

(Continued)

*Primary Examiner* — William H Rodriguez
(74) *Attorney, Agent, or Firm* — Cantor Colburn LLP

(57) ABSTRACT

Disclosed is a linkage assembly for a gas turbine engine having a link having a first end, a second end, and a rod extending therebetween, the first end having a first sliding bearing disposed within a first sliding bearing housing, a fastener comprising a first flange and a second flange, a pin extending between the first flange and the second flange, wherein the first sliding bearing is pivotally connected to the pin; and a biasing member secured between the first flange and the sliding bearing housing, the biasing member contacting the sliding bearing housing and biasing the link against rotation about a center axis for the rod of the link.

10 Claims, 10 Drawing Sheets

(58) Field of Classification Search
CPC .. F16C 11/106; F16C 2360/23; F16C 23/045; F16C 7/02
See application file for complete search history.

(56) References Cited

U.S. PATENT DOCUMENTS

| | | | |
|---|---|---|---|
| 6,371,681 B1 | 4/2002 | Covington et al. | |
| 8,888,396 B2 | 11/2014 | Halcom et al. | |
| 9,624,965 B2 | 4/2017 | Leger | |
| 10,167,894 B2 | 1/2019 | James | |
| 10,344,802 B1* | 7/2019 | Hurst | F16C 33/7876 |
| 2008/0230629 A1* | 9/2008 | Martin | F02K 1/70 |
| | | | 239/265.33 |
| 2013/0114995 A1* | 5/2013 | Godiot | F16C 11/0614 |
| | | | 403/59 |
| 2015/0166189 A1* | 6/2015 | Cassagne | B64D 27/12 |
| | | | 244/54 |
| 2015/0166191 A1* | 6/2015 | Cassagne | F16C 11/045 |
| | | | 244/54 |
| 2015/0167726 A1* | 6/2015 | Cassagne | B64D 27/26 |
| | | | 411/136 |
| 2015/0204378 A1 | 7/2015 | Teulou et al. | |
| 2015/0259063 A1* | 9/2015 | Osvog | F16C 25/04 |
| | | | 403/113 |
| 2016/0076401 A1* | 3/2016 | Besnard | B64D 27/26 |
| | | | 248/666 |
| 2017/0102026 A1 | 4/2017 | Florent et al. | |
| 2017/0292472 A1* | 10/2017 | Alholm | B23P 15/003 |
| 2017/0335884 A1 | 11/2017 | Simpson et al. | |
| 2017/0335885 A1 | 11/2017 | Simpson et al. | |
| 2018/0347622 A1 | 12/2018 | Turmeau et al. | |
| 2019/0078533 A1 | 3/2019 | Simpson et al. | |
| 2019/0161198 A1 | 5/2019 | Combes et al. | |
| 2019/0241272 A1 | 8/2019 | Geliot et al. | |

FOREIGN PATENT DOCUMENTS

| | | |
|---|---|---|
| EP | 2986862 B1 | 3/2017 |
| GB | 2429242 A | 2/2007 |

OTHER PUBLICATIONS

European Search Report for Application No. 18182320.4-1013; dated Jan. 2, 2019; 7pgs.

* cited by examiner

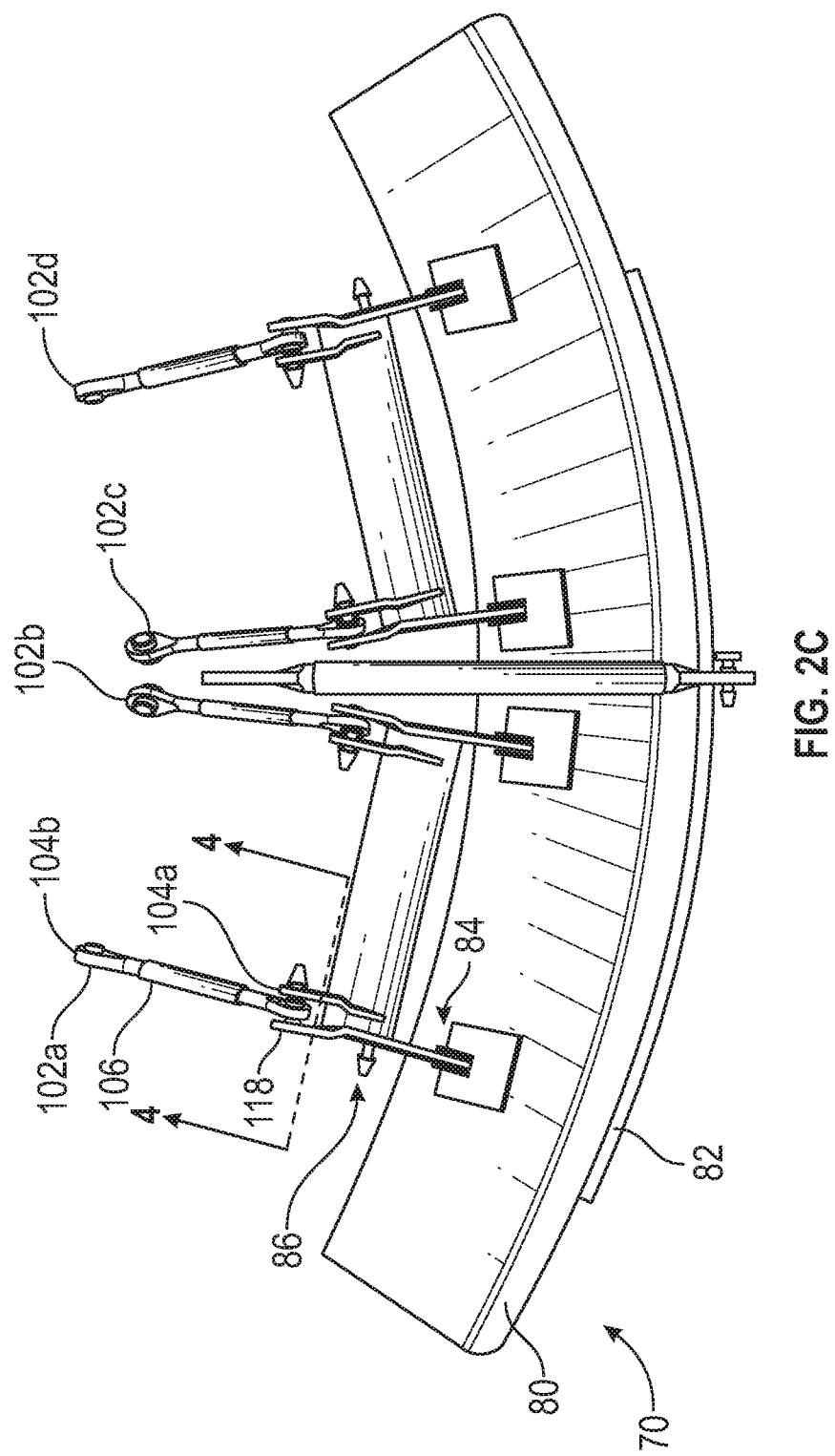

LINKAGE ASSEMBLY PREVENTING AXIAL ROTATION OF THE LINK ROD FOR A GAS TURBINE ENGINE

CROSS-REFERENCE TO RELATED APPLICATIONS

This application is a continuation of U.S. application Ser. No. 15/700,042 filed Sep. 8, 2017, the disclosure of which is incorporated herein by reference in its entirety

STATEMENT OF FEDERAL SUPPORT

This invention was made with Government support under Contract No. FA8626-15-D-0015-3501/3502 awarded by the United States Air Force. The Government has certain rights in the invention.

BACKGROUND

Exemplary embodiments pertain to the art of connection joints and more specifically to linkage assemblies in gas turbine engines that include links, which convert rotation to linear motion.

An implementation of a radial spherical plain bearing link (link) allows for three rotational degrees of freedom at each end of the link. In a linkage assembly where the link is intended to convert rotational motion to linear motion this configuration may result in an unconstrained rotational degree of freedom about a longitudinal axis of the link. A solution is desired to remove the rotational degree of freedom that can be applied to current and future implementations preferably without the need to replace hardware.

BRIEF DESCRIPTION

Disclosed is a linkage assembly for a gas turbine engine comprising: a link having a first end, a second end, and a rod extending therebetween, the first end having a first sliding bearing disposed within a first sliding bearing housing, a fastener comprising a first flange and a second flange, a pin extending between the first flange and the second flange, wherein the first sliding bearing is pivotally connected to the pin; and a biasing member secured between the first flange and the sliding bearing housing, the biasing member contacting the sliding bearing housing and biasing the link against rotation about a center axis for the rod of the link.

In addition to one or more of the features described above, or as an alternative, further embodiments may include that the first flange has a first elongated C-groove and the second flange has a second elongated C-groove, each elongated C-groove opening towards the first sliding bearing housing, and the biasing member comprises a plurality of biasing members, including: a first elongated C-brace seated in the first elongated C-groove and contacting the first sliding bearing housing, and a second elongated C-brace seated in the second elongated C-groove and contacting the first sliding bearing housing.

In addition to one or more of the features described above, or as an alternative, further embodiments may include that the first elongated C-brace has a first opening and the second elongated C-brace has a second opening and the pin extends through the first elongated C-brace opening and the second elongated C-brace opening.

In addition to one or more of the features described above, or as an alternative, further embodiments may include that the first elongated C-brace has a first set of circumferential ends disposed against the first sliding bearing housing and the second elongated C-brace has a second set of circumferential ends disposed against the first sliding bearing housing.

In addition to one or more of the features described above, or as an alternative, further embodiments may include that the biasing member is an elastic biasing member that includes a first annular spacer having a first opening through which the pin extends, the first annular spacer contacting the first flange and the first sliding bearing.

In addition to one or more of the features described above, or as an alternative, further embodiments may include that the biasing member is a flat U shaped spring having a first leg extending along the first flange, a second leg extending away from the first sliding bearing housing, a return bend, and a return leg extending toward the first sliding bearing housing to press against the first sliding bearing housing.

In addition to one or more of the features described above, or as an alternative, further embodiments may include a second annular spacer having a second opening through which the pin extends, the second annular spacer disposed between the second flange and the first sliding bearing.

In addition to one or more of the features described above, or as an alternative, further embodiments may include that the first annular spacer and second annular spacer are contoured to fit against an arcuate surface of the first sliding bearing.

Further disclosed is a gas turbine engine including: an engine fixed structure; and a plurality of linkage assemblies connecting the engine fixed structure to the movable engine structure, each linkage assembly comprising one or more of the above disclosed features.

In addition to one or more of the features described above, or as an alternative, further embodiments may include a variable area exhaust nozzle, wherein: a flap train of the variable area exhaust nozzle is the engine movable structure and a synchronization ring for the variable area exhaust nozzle is slidingly disposed in the engine fixed structure, and each fastener is a bell crank having three pivotal connection points, including a first pivotal connection point connected to the first sliding bearing, a second pivotal connection point that is a fulcrum connected to the engine fixed structure, and a third pivotal connection point connected to a coupler link, the coupler link connecting each fastener to the synchronization ring.

In addition to one or more of the features described above, or as an alternative, further embodiments may include that for each linkage assembly, the second end of the link includes a second sliding bearing in a second sliding bearing housing, and the second sliding bearing is pivotally connected to the flap train.

In addition to one or more of the features described above, or as an alternative, further embodiments may include that the synchronization ring is slidingly disposed in a linearly extending cavity in the engine fixed structure.

In addition to one or more of the features described above, or as an alternative, further embodiments may include that the flap train includes a plurality of flap train links pivotally connected between the flap train and the engine fixed structure for controlling pivotal motion of the flap train.

BRIEF DESCRIPTION OF THE DRAWINGS

The following descriptions should not be considered limiting in any way. With reference to the accompanying drawings, like elements are numbered alike:

FIGS. 2A, 2B and 2C illustrate a portion of a variable area exit nozzle connected to a plurality of linkage assemblies according to an embodiment of the disclosure;

DETAILED DESCRIPTION

A detailed description of one or more embodiments of the disclosed apparatus and method are presented herein by way of exemplification and not limitation with reference to the Figures.

Figure 1:
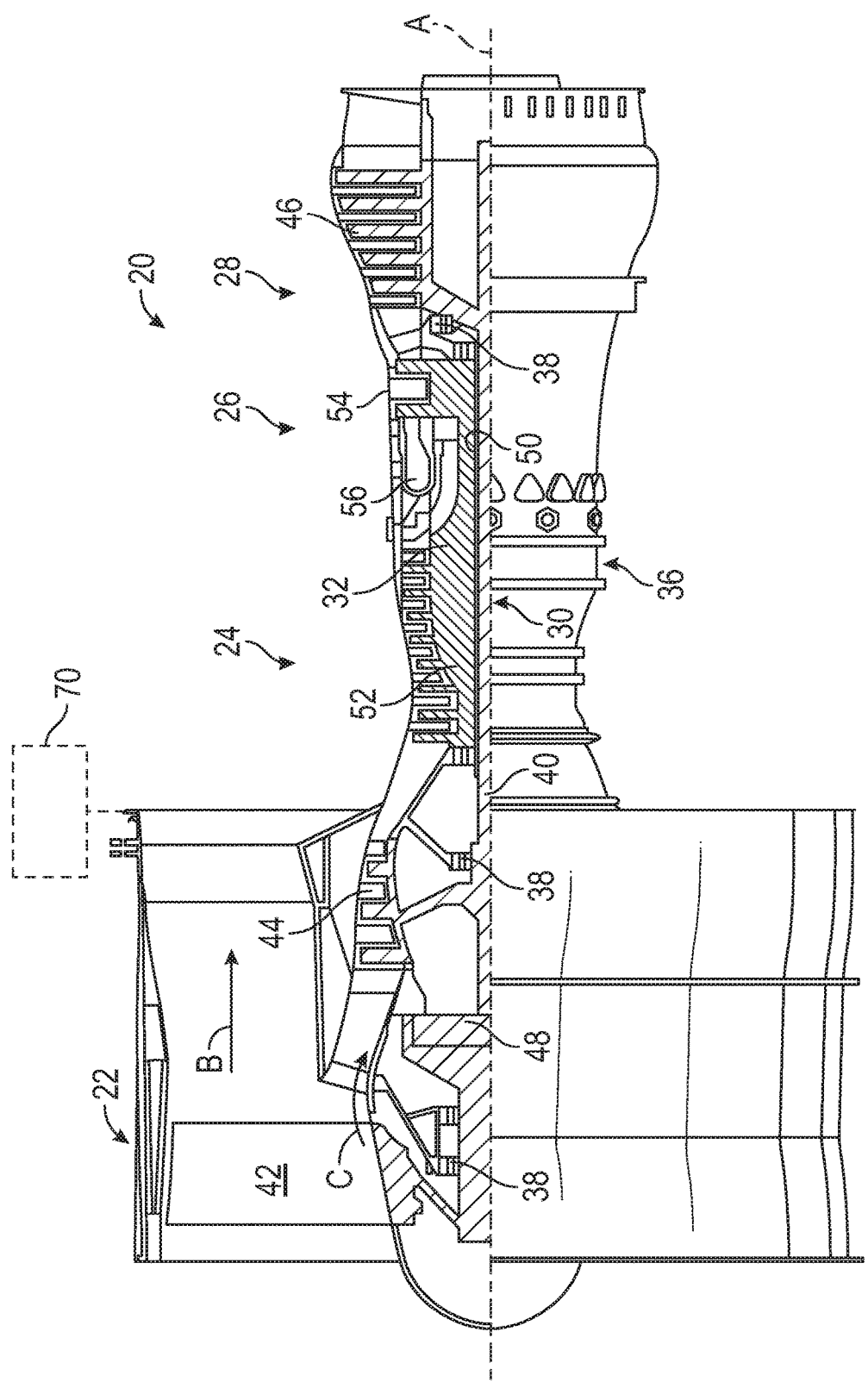
FIG. 1 is an exploded view of a gas turbine engine according to an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be utilized, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10). In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present disclosure is applicable to other gas turbine engines including direct drive turbofans.

Turning to FIGS. 1, 2A-2C, and 3, portions of a variable area exhaust nozzle (nozzle) 70 are illustrated. In addition, a plurality of bearing linkages (or links) 102a-102d including first link 102a are illustrated. The links 102a-102d may be radial spherical plain bearing link rods. The links 102a-102d may be indirectly connected on one side to a synchronization (or synch) ring 80 for example, as positioned by an actuator or other device (not shown) for prescribing the axial position of the sync ring 80. The synch ring 80 may translate in an engine fixed structure 82. The synch ring 80 may slidingly drive the link assembly in the disclosed embodiment.

The synch ring 80 may be pivotally connected to a coupler rod (or link) 84. The coupler link 84 may in turn may be pivotally connected to a L-link (or bell crank) 86. The fulcrum 88 of the bell crank 86 may be pivotally connected to the engine fixed structure 82 and the bell crank 86 may convert linear motion from the synch ring 80 to rotational motion.

Figure 2A:
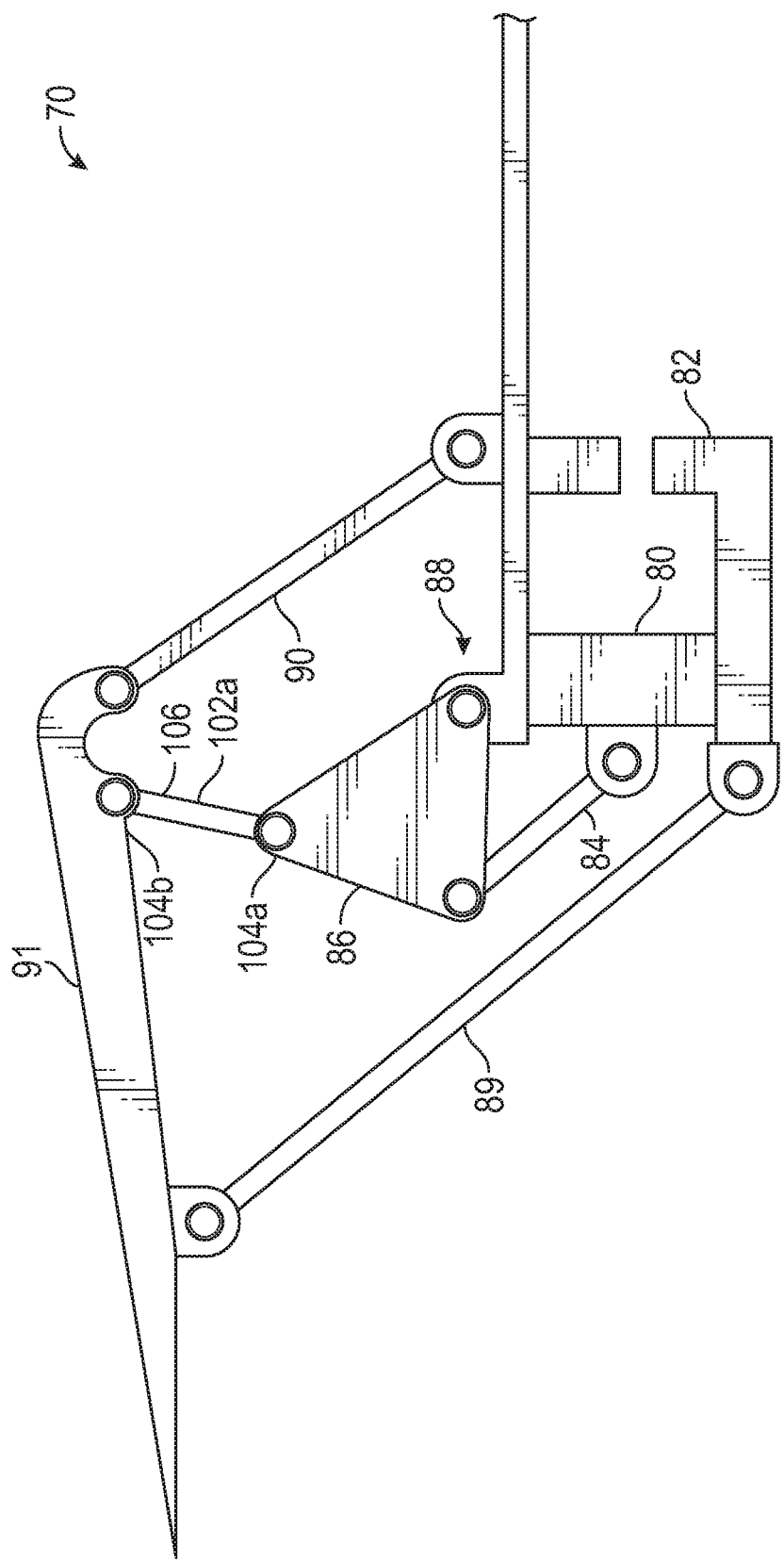
Figure 2B:
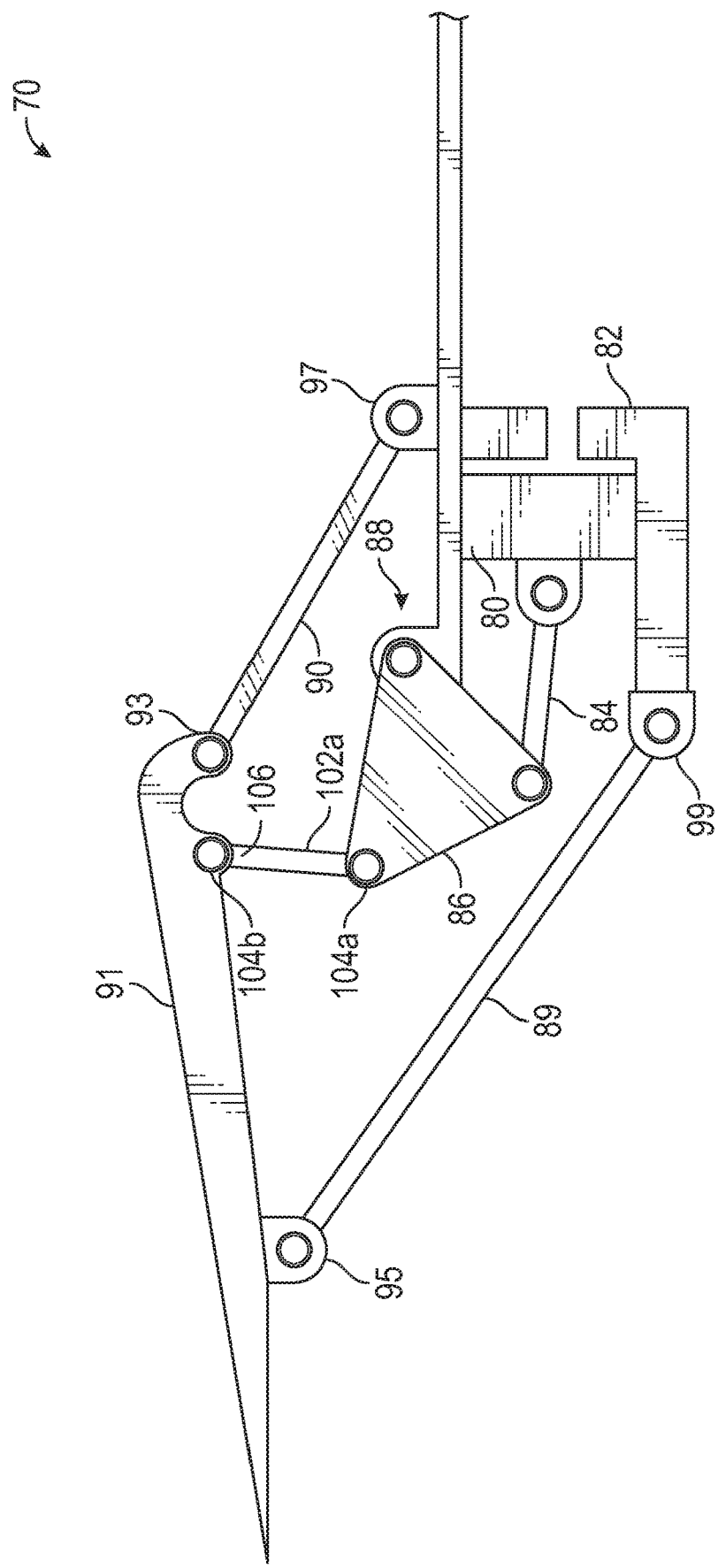

As illustrated in FIGS. 2A, 2B and 2C, the rotational motion from the bell crank 86 may be transferred to the links 102a-102d. Each of the links 102a-102b may be pivotally connected on opposing longitudinal end joints 104a, 104b of the respective links 102a-102b between the bell crank 86 and a movable flap train 91. This connection transfers rotational motion to plural flap train links including a first flap train link 89 and a second flap train link 90 controlling motion of the flap train 91. The flap train links 89, 90 may be respectively pivotally connected to the flap train 91 at locations upstream 93 and downstream 95 of the end joint 104b of the respective links 102a-102d. On opposing longitudinal ends 97, 99 of the flap train links 89, 91 may be pivotally connected to the engine fixed structure 82. The links 102a-102d function as drive links and the movable flap train 91 moves in response to the synch ring 80 to change the area of the nozzle. It is to be appreciated that such links 102a-102d may be also used for other aircraft moving parts, such as variable vanes and landing gear.

Figure 3:
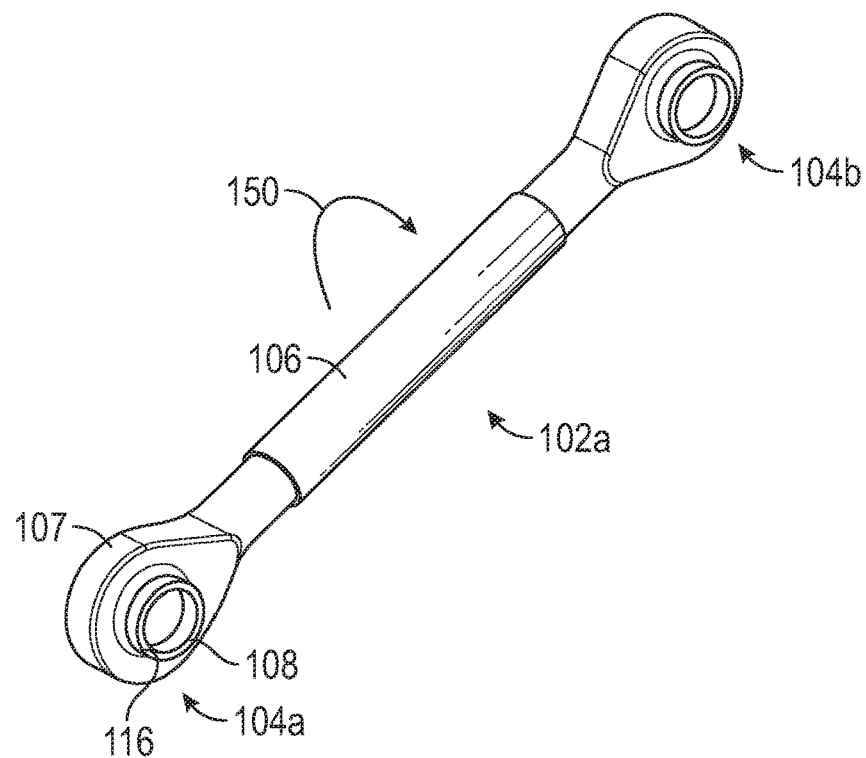
FIG. 3 is a link according to an embodiment of the disclosure.
Figure 4:
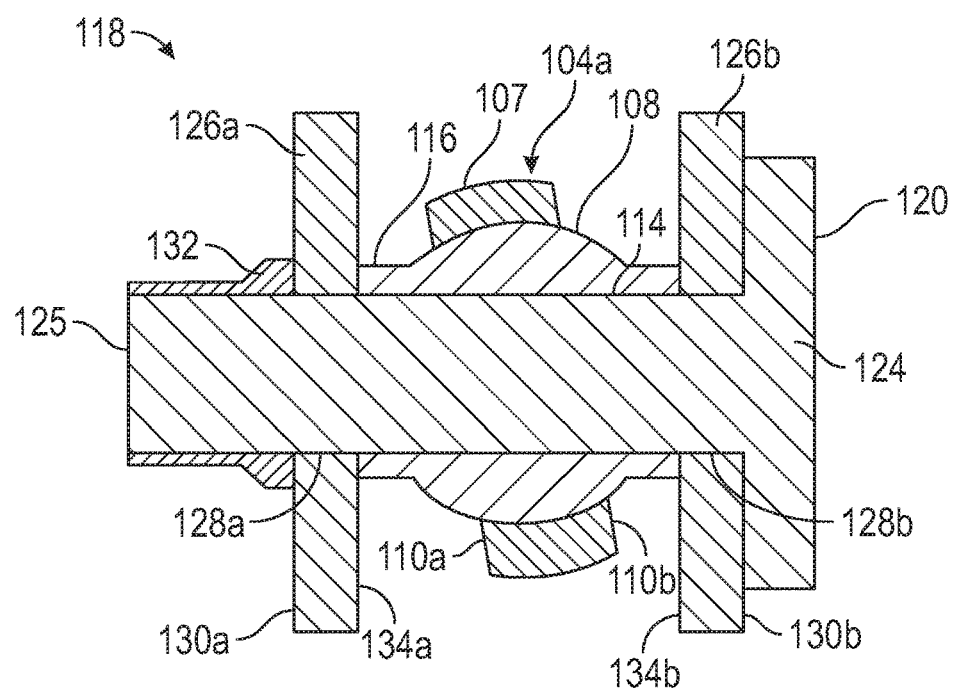
FIG. 4 is a linkage assembly according to an embodiment of the disclosure.

Turning to FIGS. 3 and 4, further attention will be given to the structure of the first link 102a and a connection of the same to the bell crank 86. The first link 102a may have first and second heads (or joint ends) 104a, 104b that may be connected by a tubular rod 106. Turning to the first joint end 104a, a sliding bearing 108 is illustrated in a bearing housing 107. The sliding bearing 108 has an arcuate contact surface and may be a radial spherical plain bearing.

The bearing housing 107 has first and second opposed planar surfaces 110a, 110b and a profile shape that may define a teardrop shape or a fisheye or a lollypop shape. The sliding bearing 108 may include a center bore 114 and a cylindrical collar 116 may extend outwardly from the bore 114. Though the discussion herein includes the collar 116 an embodiment without the collar 116 is within the scope of the disclosure.

The first link 102a may be pivotally connected to the bell crank 86 via a clevis fastener (or fastener) 118. The bracket 118 may have first and second opposed flanges 126a, 126b and a pin 120 extending therebetween. The pin 120 may have a diameter sized to slide through bore 114 of the sliding bearing 108. Each of the flanges 126a, 126b may have a center opening 128a, 128b for the pin 120 to slide therethrough. The span between the flanges 126a, 126b may be small enough so that the sliding bearing 108 does not slide therebetween. With this configuration the first link 102a may rotate about the sliding bearing 108 while the sliding bearing 108 remains stationary on the bracket 118.

A pin free end 125 may be locked against an external side of the first flange 126a with a pin lock 132. The pin head 124 may contact an exterior of the second flange 126b.

Figure 5A:
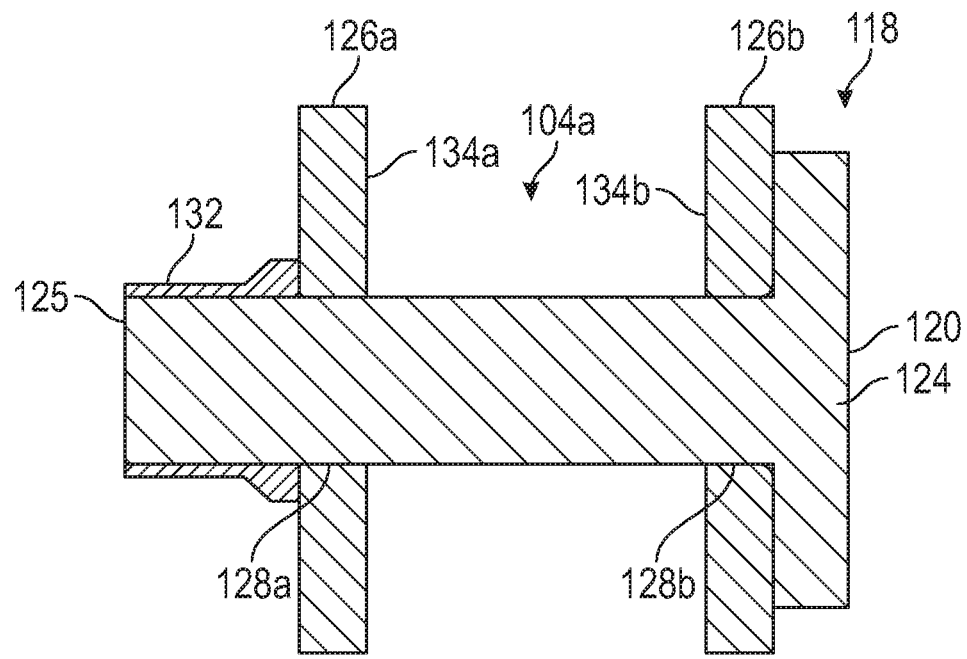
FIGS. 5A-5D illustrate features of a linkage assembly according to an embodiment of the disclosure.
Figure 5B:
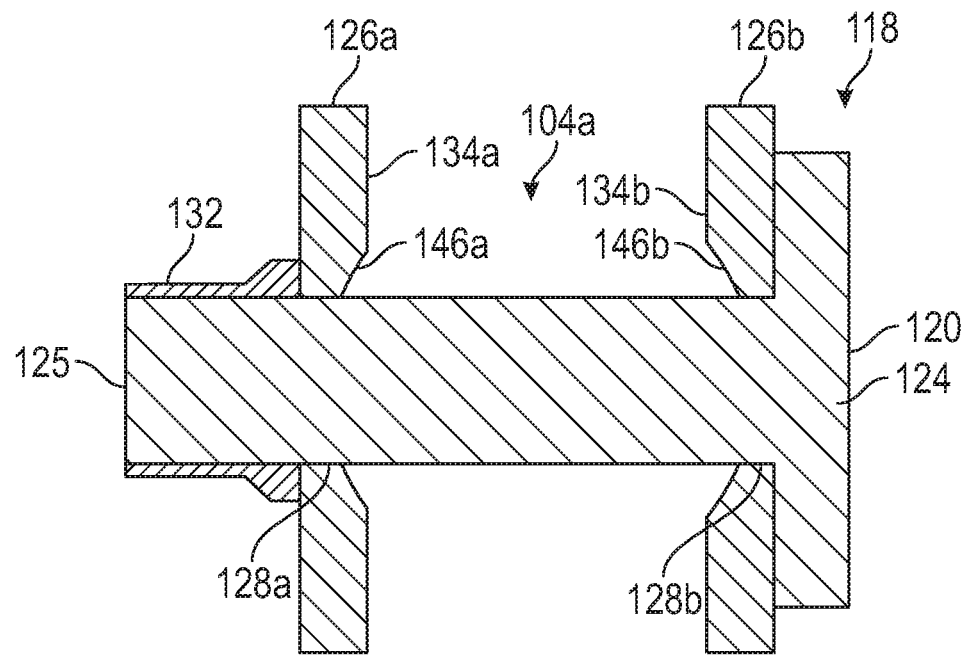
Figure 5C:
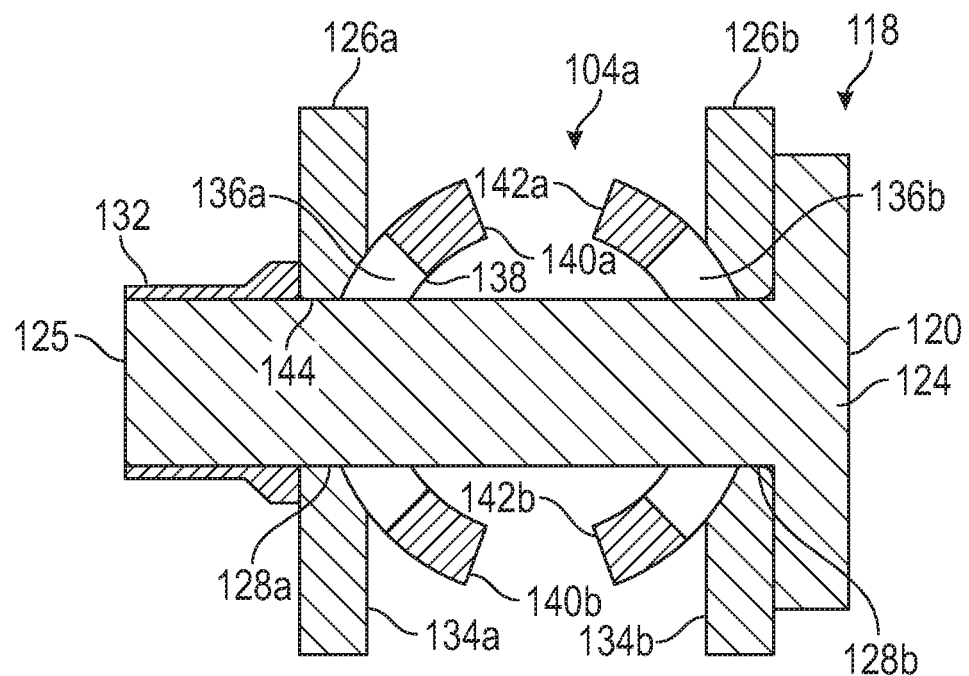
Figure 5D:
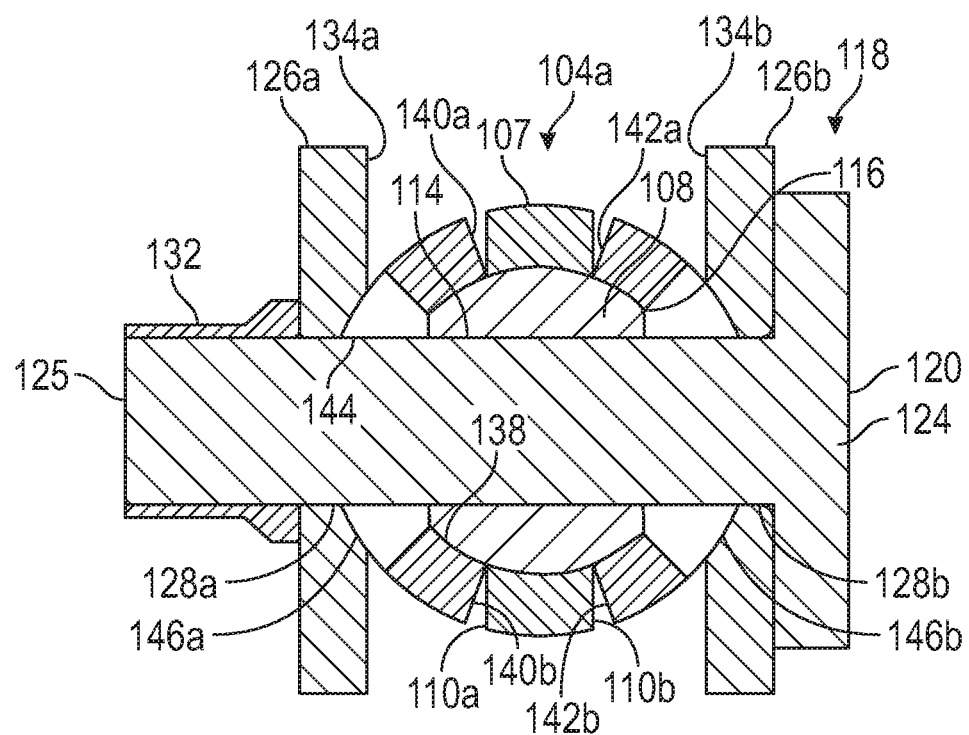
Figure 6:
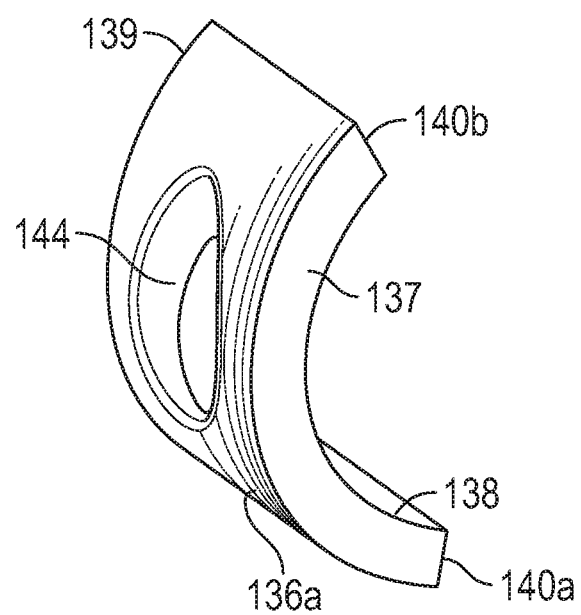
FIG. 6 is brace for a linkage assembly according to an embodiment of the disclosure.

Turning to FIGS. 5A-5D and 6, first and second biasing members, which may be elongated C-braces 136a, 136b, may be included. FIGS. 5A-5C illustrate various details disclosed below for modifying the fastener 118 and assembling the C-braces 136a, 136b thereon. FIG. 6 illustrates the first C-brace 136a in isolation.

The C-braces 136a, 136b bias the first link 102a against rotation about the rod center axis i.e., against the direction 150 illustrated in FIG. 3. The C-braces 136a, 136b may be rigid, i.e., inelastic, to prevent rotation about the rod center axis. The first C-brace 136a may be positioned between the bearing housing 107 and the first flange 126a. The second C-brace 136b may be positioned between the bearing housing 107 and the second flange 126b.

Turning to the first C-brace 136a, a first through-hole (or opening) 144 may be disposed therein. The first C-brace opening 144 has a diameter sized to slide over the pin 120 and collar 116, as illustrated in FIG. 5C. An inner facing surface (e.g., facing a center of the bracket 118) of the first C-brace 136a may have a diameter sized to fit against the sliding bearing 108. A first inner facing arcuate cutout (or elongated C-groove) 146a may be disposed in the inner facing surface 134a of the first flange 126a as illustrated in FIGS. 5B-5D. The C-grove 146a extends in the same direction as the length of the first C-brace 136a, e.g., in the direction defined between the top edge 137 and bottom edge 139 of the first C-brace 136a. The C-grove 146a seats an outer facing surface (e.g., facing away from a center of the bracket 118) of the first C-brace 136a as illustrated in FIGS. 5C and 5D. A second C-grove 146b on the second inner facing surface 134b of the second flange 126b is illustrated with the second C-brace 136b in FIG. 5D.

With both C-braces 136a, 136b in the linkage assembly, a first set of opposing circumferential ends 140a, 142a of the first C-brace 136a contacts the first housing surface 110a. Concurrently a second set of opposing circumferential ends 140b, 142b of the second C-brace 136b contacts the second housing surface 110b. The C-braces 136a, 136b are long enough to disburse reactance forces and torques into the C-braces and bearing housing without damaging the same. As such, the wear surfaces for the linkage assembly are the housing surfaces 110a, 110b and the sets of opposing circumferential ends of the C-braces 136a, 136b.

Figure 7:
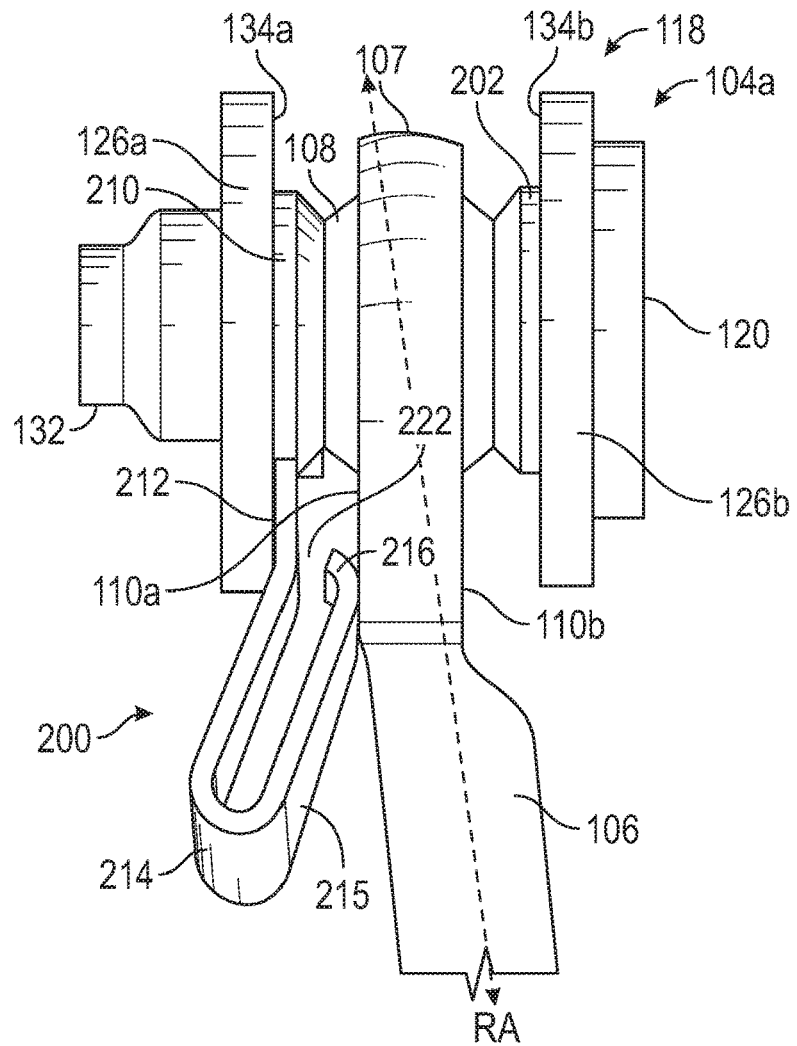
FIG. 7 illustrates a linkage assembly according to an embodiment of the disclosure.

Turning to FIG. 7, another embodiment is disclosed where the rod 106 of the link 102a has a longitudinal axis (RA) that may be offset or acutely angled away from the first flange 126a and toward the second flange 126b. In such circumstance, the biasing member may be an elastic biasing member such as a spring 200 that eliminates rotational motion in the direction 150 illustrated in FIG. 3. As illustrated the spring 200 may be disposed between the first flange 126a and the first housing surface 110a.

Figure 8:
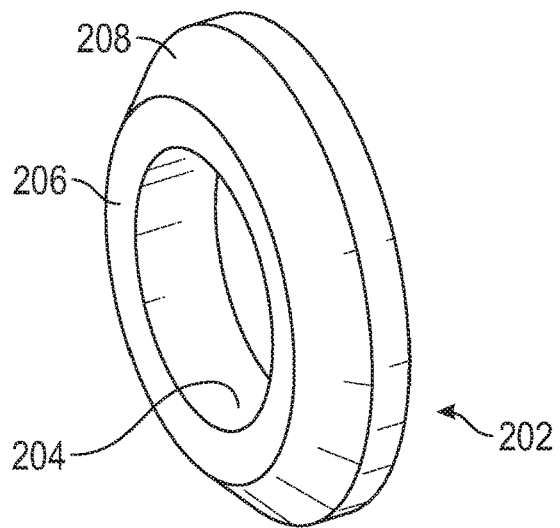
FIG. 8 illustrates a spacer for a linkage assembly according to an embodiment of the disclosure.

A first washer 202 may be disposed against the second flange 126b for centering the sliding bearing 108 on the bracket 118. As illustrated in FIGS. 7 and 8, the first washer 202 may have an orifice 204 with a chamfered edge 206. This configuration enables the first washer 202 to fit around the collar 116 and against the sliding bearing 108 to cause sliding contact, i.e., a wear surface. The outer diameter 208 of the first washer 202 is illustrated as being substantially the same as the spherical diameter of the sliding bearing 108, though other diameters are within the scope of the disclosure.

With reference to FIGS. 7, 8, 9a and 9b, the spring 200 also has a second washer (a spring washer) 210, which may be sized similarly to the first washer 202. The spring washer 210 is an additional wear surface and centers the bearing housing 107 between the flanges 126a, 126b.

The spring 200 forms a U-shaped compression spring having a linearly extending first leg 212 that extends away from the spring washer 210 and extends adjacent to the first flange 126a. At the end of the first leg 212, there is a bend (or inflection) 222 in the spring 200 after which a second leg 213 continues to extend away from the spring washer 210 and is angled away from the bearing housing 107. Such bend may result in a spring configuration having additional spring pre-loading and/or spring potential.

At the end of the second leg 213 the spring 200 has a return U-bend 214 and a linearly extending return leg 215 that extends back toward the spring washer 210 and is angled toward the bearing housing 107. A spring foot (or free end) 216 contacts the first housing surface 110a and extends partially back toward the first flange 126a. This configuration results in an edgeless contact at the location of expected surface wear. The depth-wise span of the spring 200 enables contact between the free end 216 of the spring 200 and the first housing surface 110a throughout the rotational range of the first link 102a.

Figure 9A:
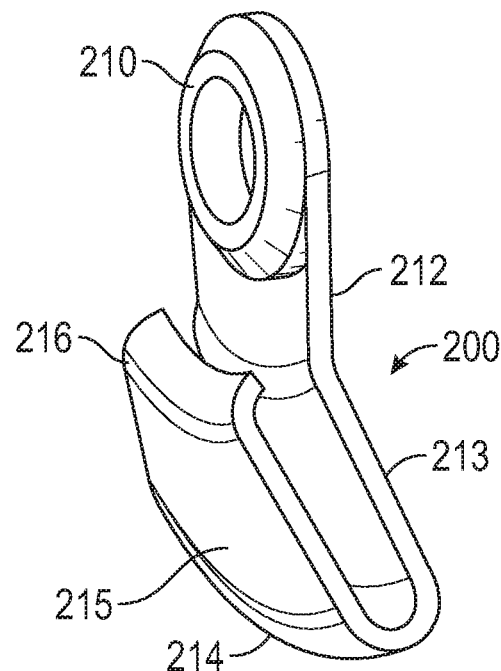
FIGS. 9a-9b illustrate a biasing member for a linkage assembly according to an embodiment of the disclosure.
Figure 9B:
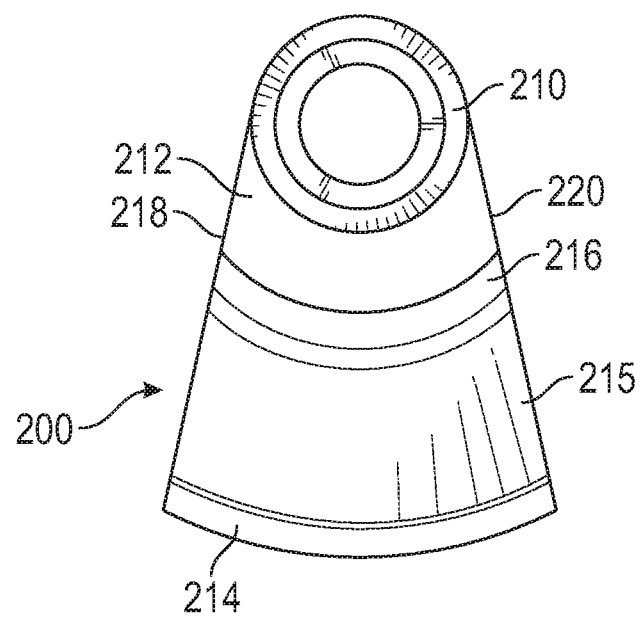

As illustrated in FIG. 9B, the side profile edges 218, 220 of the spring 200 may extend tangentially between the spring washer 210 and the return bend 214. The resulting shape in a plan view is a rounded trapezoid.

It is to be appreciated that a configuration in which an additional spring is between the second flange 126b and the bearing housing 107 is within the scope of the disclosure.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A linkage assembly for a gas turbine engine comprising:
a link having a first end, a second end, and a rod extending therebetween, the first end having a first sliding bearing disposed within a first sliding bearing housing, the first sliding bearing housing having first and second opposed planar surfaces,
a fastener comprising a first flange and a second flange that respectively have first and second inner facing surfaces, a pin extending between the first flange and the second flange, wherein the first sliding bearing is pivotally connected to the pin so that the first planar surface of the sliding bearing housing faces the first inner facing surface of the first flange and the second planar surface of the sliding bearing housing faces the second inner facing surface of the second flange; and
a biasing member secured between the first inner facing surface of the first flange and the first planar surface of the sliding bearing housing, the biasing member contacting the first planar surface of the sliding bearing housing and biasing the link against rotation about a center axis for the rod of the link, and
wherein the biasing member is an elastic biasing member that includes a first annular spacer, defining a washer, having a first opening through which the pin extends, the first annular spacer contacting the first inner facing surface of the first flange and the first planar surface of the first sliding bearing, and
wherein the biasing member is a flat U shaped spring having:
a first leg extending along the first inner facing surface of the first flange;
a second leg extending away from the first planar surface of the first sliding bearing housing;
a return bend; and
a return leg extending toward the first planar surface of the first sliding bearing housing, and
a foot of the return leg defining a free end of the biasing member, presses against the first planar surface of the first sliding bearing housing.

2. The assembly of claim 1, including a second annular spacer having a second opening through which the pin extends, the second annular spacer disposed between the second flange and the first sliding bearing.

3. The assembly of claim 2, wherein the first annular spacer and second annular spacer are contoured to fit against an arcuate surface of the first sliding bearing.

4. A gas turbine engine including:
an engine fixed structure;
a plurality of linkage assemblies connecting the engine fixed structure to a movable engine structure, each linkage assembly comprising:
a link having a first end, a second end, and a rod extending therebetween, the first end having a first sliding bearing disposed within a first sliding bearing housing, the first sliding bearing housing having first and second opposed planar surfaces,
a fastener comprising a first flange and a second flange that respectively have first and second inner facing surfaces, a pin extending between the first flange and the second flange, wherein the first sliding bearing is pivotally connected to the pin so that the first planar surface of the sliding bearing housing faces the first inner facing surface of the first flange and the second planar surface of the sliding bearing housing faces the second inner facing surface of the second flange; and
a biasing member secured between the first inner facing surface of the first flange and the first planar surface of the sliding bearing housing, the biasing member contacting the first planar surface of the sliding bearing housing and biasing the link against rotation about a center axis for the rod of the link, and
wherein the engine fixed structure is connected to the linkage assemblies through each fastener and the engine movable structure is connected to the linkage assemblies thorough each link, and
wherein for each linkage assembly:
the biasing member is an elastic biasing member that includes a first annular spacer, defining a washer, having a first opening through which the pin extends, the first annular spacer contacting the first inner facing surface of the first flange and the first planar surface of the first sliding bearing, and
wherein the biasing member is a flat U shaped spring having:
a first leg extending along the first inner facing surface of the first flange;
a second leg extending away from the first planar surface of the first sliding bearing housing;
a return bend; and
a return leg extending toward the first planar surface of the first sliding hearing housing, and
a foot of the return leg, defining a free end of the biasing member, presses against the first planar surface of the first sliding bearing housing.

5. The engine of claim 4, wherein each linkage assembly includes a second annular spacer having a second opening through which the pin extends, the second annular spacer disposed between the second flange and the first sliding bearing.

6. The engine of claim 5, wherein for each linkage assembly the first annular spacer and second annular spacer are contoured to fit against an arcuate surface of the first sliding bearing.

7. The engine of claim 6, including a variable area exhaust nozzle, wherein:
a flap train of the variable area exhaust nozzle is the engine movable structure and a synchronization ring for the variable area exhaust nozzle is slidingly disposed in the engine fixed structure, and each fastener is a bell crank having three pivotal connection points, including a first pivotal connection point connected to the first sliding bearing, a second pivotal connection point that is a fulcrum connected to the engine fixed structure, and a third pivotal connection point connected to a coupler link, the coupler link connecting each fastener to the synchronization ring.

8. The engine of claim 7, wherein for each linkage assembly, the second end of the link includes a second sliding bearing in a second sliding bearing housing, and the second sliding bearing is pivotally connected to the flap train.

9. The engine of claim 8, wherein the synchronization ring is slidingly disposed in a linearly extending cavity in the engine fixed structure.

10. The engine of claim 9, wherein the flap train includes a plurality of flap train links pivotally connected between the flap train and the engine fixed structure for controlling pivotal motion of the flap train.

\* \* \* \* \*